United States Patent [19]

Ishii

[11] Patent Number: 5,557,417
[45] Date of Patent: Sep. 17, 1996

[54] MULTI-LOOP TESTING APPARATUS WITH MEANS FOR ADJUSTING A REPRODUCED VIDEO SIGNAL

[75] Inventor: Mikio Ishii, Kanagawa, Japan

[73] Assignee: Sony Corporation, Tokyo, Japan

[21] Appl. No.: 185,754

[22] Filed: Jan. 24, 1994

Related U.S. Application Data

[63] Continuation of Ser. No. 865,937, Apr. 9, 1992, abandoned.

[30] Foreign Application Priority Data

Apr. 11, 1991 [JP] Japan .................................. 3-163291

[51] Int. Cl.$^6$ .................................................. H04N 5/76
[52] U.S. Cl. .......................... 358/310; 358/320; 358/337; 358/339; 360/31
[58] Field of Search .............................. 360/33.1, 27, 31, 360/54, 35.1; 358/335, 310, 325, 327, 336; 348/180; 369/48, 49, 50, 58, 116; H04N 5/92, 5/76, 5/78, 5/781, 5/782, 5/783, 17/02, 17/00, 9/79, 9/89, 5/94

[56] References Cited

U.S. PATENT DOCUMENTS

| 4,325,080 | 4/1982 | Satoh | 358/224 |
| 4,998,171 | 3/1991 | Kim et al. | 358/183 |
| 5,070,495 | 12/1991 | Bletscher, Jr. et al. | 369/116 |
| 5,072,435 | 12/1991 | Bakx | 369/48 |
| 5,146,210 | 9/1992 | Heberle | 358/194.1 |

FOREIGN PATENT DOCUMENTS

| 50-3111 | of 1975 | Japan . | |
| WO87/06420 | 10/1987 | WIPO | 360/33.1 |

*Primary Examiner*—Thai Q. Fran
*Attorney, Agent, or Firm*—William S. Frommer; Alvin Sinderbrand

[57] ABSTRACT

Apparatus for adjusting a digital signal which is subjected to analog processing after being reproduced from a record medium includes a digital test signal source, a loop including DAC and ADC for circulating the digital test signal therethrough a predetermined number of times, a detector for detecting changes in the test signal after having been circulated through the loop, and adjustment means having adjustment values set in response to the detected changes so as to adjust predetermined characteristics of a digital video signal that subsequently may be reproduced from the record medium, thereby minimizing changes and degradations in the reproduced digital video signal that otherwise would be caused by the analog processing.

33 Claims, 3 Drawing Sheets

MULTI-LOOP TESTING APPARATUS WITH MEANS FOR ADJUSTING A REPRODUCED VIDEO SIGNAL

This application is a continuation of application Ser. No. 07/865,937, filed Apr. 9, 1992, now abandoned.

BACKGROUND OF THE INVENTION

This invention relates to a technique for reducing degradation and deterioration of video signals which, after being reproduced from a digital record medium are subjected to analog processing and, more particularly, to such a technique which uses a multi-loop test for anticipating and correcting such deterioration and degradation.

Digital video recorders are known to provide video signals of high quality which, when subjected to digital processing, suffer little, if any, deterioration. Such digital video signals may be reproduced, recorded and re-recorded several times; and the inherent characteristics of digital signals and digital processing permit repeatability of the reproduction of such digital video signals without loss of quality. However, when digital video signals are subjected to analog processing, such as conversion from digital to analog form, analog recording, analog transmission, and the like, the resultant analog signals may be degraded in comparison to the original digital video signals. If the analog video signal is dubbed and re-dubbed several times, such degradation is multiplied and deterioration of the video signal and video picture ultimately reproduced therefrom becomes quite noticeable. Even if the analog video signal is converted to digital form, as by an analog-to-digital converter, for digital processing and recording, the inherent quantizing noise associated with such A/D conversion adds to the deterioration of the video signal.

Typically, degradation of the video signal appears as errors in the amplitude, frequency, phase or reference signal levels (e.g. the video black signal level) in the analog video signal. Such errors often are not uniform and constant but, rather, vary as a function of the analog processing to which the video signal is subjected, as well as the apparatus and operating characteristics used to process, record, reproduce or transmit the video signals. If apparatus which tends to introduce the aforenoted errors are connected in cascade, the deterioration of the video signal caused thereby is aggravated.

In anticipation of such degradation of the video signals caused by analog recording and reproduction thereof, recording/reproducing apparatus often is adjusted, or pre-set during manufacturing to compensate or pre-correct for expected errors. However, such pre-settings often must be readjusted by the end user of the apparatus, which is a difficult, time-consuming and laborious task. Indeed, manual adjustments to minimize degradation of the video signal that is dubbed or re-dubbed often cannot be determined until several successive dubbing operations have been carried out. Furthermore, even when video signal degradation is recognized sufficiently to permit correction, it has been found that when an error associated with one type of characteristic in the video signal is corrected, errors appear in other characteristics. Thus, pre-correction adjustments often are dependent upon each other, which require several trial and error adjustment iterations of individual video signal characteristics until the user is satisfied. This difficulty is compounded when it is recognized that the errors for which such pre-correction adjustments are made often are so small that they can be detected only with difficulty. For example, when a digital video signal is reproduced, converted to analog form, recorded by an analog recorder, subsequently reproduced and displaced as an analog video signal, errors in the displayed video signal relative to the original digital video signal may be so slight as to be practically imperceptible. However, if that analog video signal subsequently is recorded and reproduced several times, its degradation relative to the original digital video signal would be clearly pronounced and noticeable.

It has been proposed heretofore to make successive recordings of a video signal and thereby subject that signal to successive degradations in order to detect the loss of quality attributed to such recordings. For example, the video signal is reproduced, delayed, fed back to be re-recorded and then reproduced once again; and this cycle is repeated several times to permit observation of deteriorations occasioned by such re-recordings. Japanese Patent Publication 50-3111 (1975) broadly describes this technique.

A similar arrangement is described in International Patent Application WO 87/06420 (1987) in which a video tape recorder is included in a loop to record in successive tracks a single field or frame of video signals that has been cycled through the loop. An initial field or frame, supplied from an external source, is recorded and practically simultaneously reproduced. This reproduced field or frame is converted to digital form in a timebase corrector and then re-converted to analog form for re-recording in the next track by the VTR. After a number of cycles, or generations, deterioration in the field or frame recorded in the nth track may be observed, thus permitting a user to effect manual adjustments to the VTR, the timebase corrector and/or the ADC and DAC. However, with this system, it is quite difficult to accurately determine the degradation to which the original field or frame has been subjected. To do so requires that the initial field or frame be reproduced and displayed and then the nth generation of that field or frame must be reproduced and displayed. This is quite time-consuming and requires the precise, rapid location of and access to the first and nth tracks on the video tape. Moreover, manual adjustments often must be made on an iterative basis, and this is not satisfactory.

OBJECTS OF THE INVENTION

Therefore, it is an object of the present invention to provide apparatus for adjusting a digital video signal reproduced from a record medium to minimize degradations and deteriorations in the video signal caused by analog processing thereof.

Another object of this invention is to provide apparatus for adjusting a digital video signal reproduced from a record medium in accordance with changes that are detected in a digital test signal that is subjected to analog processing of the type which would deteriorate the digital video signal.

A further object of this invention is to provide apparatus of the aforementioned type which is easy to use, provides accurate adjustments to the digital video signal reproduced from the record medium and avoids the drawbacks and disadvantages of the aforenoted previous proposals.

It is an additional object to provide a multi-loop test including automatic adjustment means which establishes adjustment settings for a digital video signal that may be subject to analog processing after it is reproduced from a record medium.

A still further object of this invention is to provide apparatus of the aforementioned type in which a digital test signal is circulated several times through a loop which includes adjustment means, and wherein the number of such circulations is indicated.

Yet another object of this invention is to provide apparatus for adjusting predetermined characteristics of a video signal that is subjected to analog processing after being reproduced from a record medium in which the operating mode of the apparatus being selected either as a test mode, whereby a digital test signal is circulated through a loop to establish settings for an adjustment means included therein, or a playback mode, whereby a video signal is reproduced from the record medium and has its characteristics adjusted by the adjustment means.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for adjusting a digital video signal that is subjected to analog processing after being reproduced from a record medium. As a feature of this invention, an input digital test signal is circulated a predetermined number of times through a loop which includes a digital-to-analog converter (DAC) and an analog-to-digital converter (ADC), and changes in the circulated digital test signal are detected. Adjustment means, which in one embodiment is an automatic adjustment means, exhibits adjustment values which are set in response to detected changes to adjust predetermined characteristics in a digital video signal that may be reproduced from the record medium.

As one aspect of this invention, the adjustment means provides setup adjustment to the digital video signal, for example, by responding to detected changes in a video black level represented by the digital test signal. As another aspect, the adjustment means provides video gain adjustment, for example, by responding to detected changes in a video gray level represented by the digital test signal. As a further aspect, the adjustment means provides chroma gain adjustment, for example, by responding to detected changes in a single frequency signal represented by the digital test signal. The adjustment means also is adapted to provide color hue adjustment of the digital video signal.

In accordance with another feature of this invention, a display is coupled to the loop for selectively displaying a video image derived from the digital test signal, as well as displaying an image derived from the digital signal that is reproduced from the record medium. In addition, the number of circulations of the digital test signal through the loop is sensed, and the display superimposes an indication of this sensed number. As an aspect of this feature, the superimposed indication is in the form of a bar graph, thereby providing a user with a display of detected changes in the digital test signal as well as a display of the number of times that digital test signal has circulated through the loop. As a result, rapid and accurate adjustments may be made to minimize such changes.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF A PREFERRED EMBODIMENT

Figure 1:
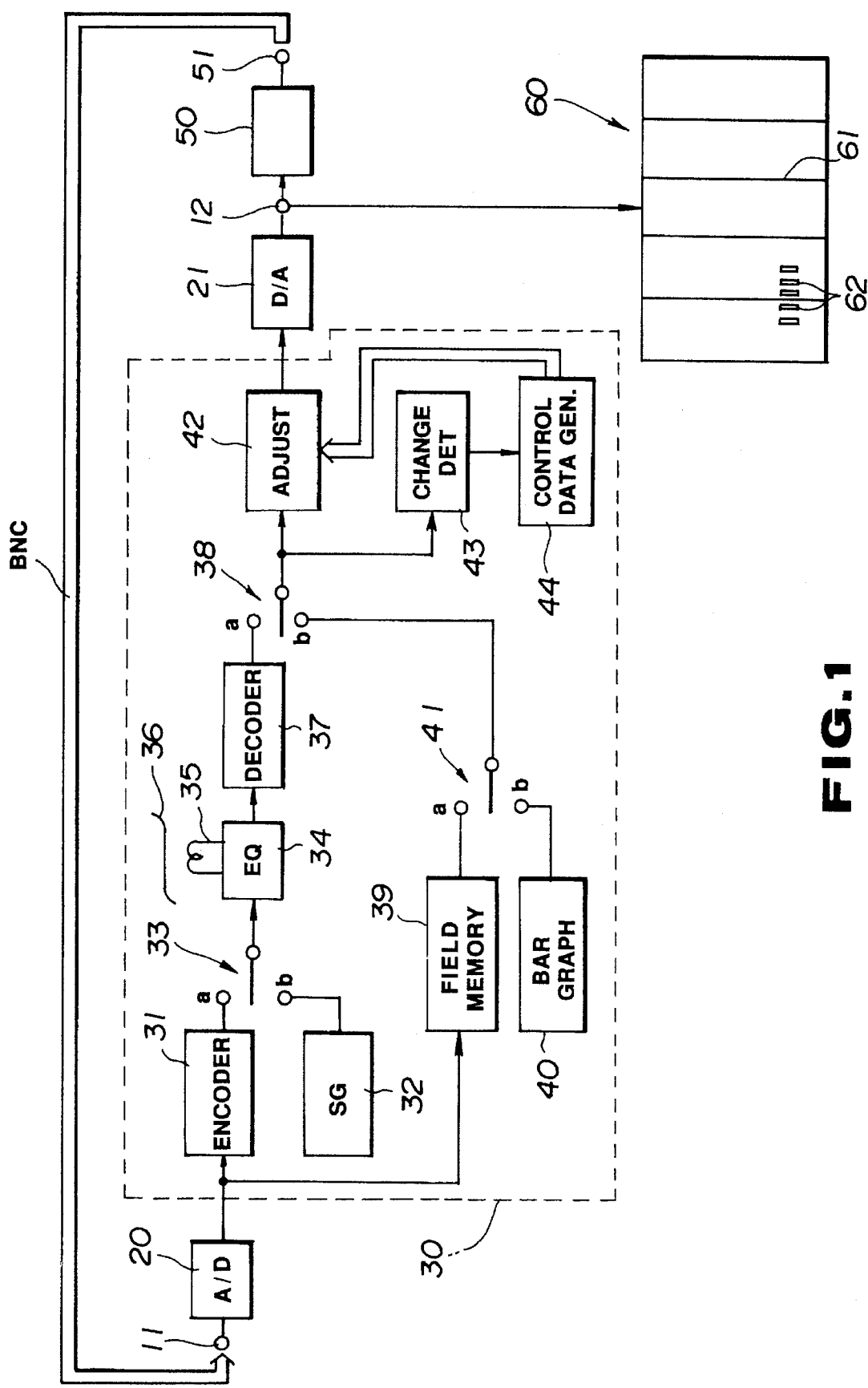
FIG. 1 is a block diagram of apparatus for adjusting a digital signal reproduced from a record medium.

Referring now to the drawings, and in particular to FIG. 1, there is illustrated a block diagram of one embodiment of apparatus in accordance with the present invention for adjusting a digital signal, preferably a digital video signal, reproduced from a record medium to compensate, or pre-correct, for degradations that otherwise would be introduced into the reproduced video signal when it subsequently is subjected to analog processing. The illustrated apparatus implements a so-called multi-loop test wherein the deterioration of various characteristics of a video signal caused by successive dubbing, or re-recording thereof is detected.

It is appreciated that little, if any, deterioration in a digital video signal is produced even when that digital video signal is subjected to multiple playback and re-recording operations, so long as the digital video signal remains in digital form. However, if the digital video signal is converted to analog form for display and/or recording on an analog recorder, a small loss of quality in the analog signal is expected. If the analog signal subsequently is reconverted to digital form and re-recorded as a digital signal, and if the foregoing digital-to-analog conversion and recording process is repeated, a further loss in quality of the analog signal is expected. Although each incremental deterioration may not be perceptible, if the digital video signal is subjected to multiple dubbing and multiple conversions, a degraded video picture ultimately results. The apparatus illustrated in FIG. 1 subjects a digital signal to multiple analog processing operations, whereupon the digital signal deteriorates in much the same manner as would occur if that digital signal had been converted to analog form, recorded as an analog signal, reconverted back into digital form, recorded as a digital signal, reproduced and converted into analog form once again, and so on, a multiple number of times. After M such analog processing operations, the deterioration in the digital signal may be more readily measured by detecting changes in predetermined characteristics thereof.

The multi-loop test implemented by the digital signal adjusting apparatus shown in FIG. 1 includes an analog input terminal 11, an analog-to-digital converter (ADC) 20, a digital-to-analog converter (DAC) 21, an analog output terminal 12, a feedback path for interconnecting analog output terminal 12 to analog input terminal 11 and a digital video system 30. The digital video system includes digital video recording/playback apparatus in which digital video signals are recorded on a magnetic medium 36, such as magnetic tape, by a record/playback head 35. Digital video signals which subsequently are reproduced from magnetic medium 36, converted to analog form and subjected to analog processing (such as analog recording or transmission) are subjected to deterioration; and this deterioration is aggravated if several generations of recording or transmission are effected. Digital video system 30 operates to pre-correct, or compensate the digital video signal reproduced from magnetic medium 36, prior to analog processing thereof, so as to minimize this deterioration, even if the digital video signal is subjected to several generations of analog processing.

The digital video recording/reproducing apparatus included in digital video system 30 includes an encoder 31 which is coupled to ADC 20 to receive a digitized video signal that had been supplied to analog input terminal 11 and to encode the digitized video signal in a conventional format. Examples of the digital recording format with which encoder 31 operates are the conventional D-1 and D-2 formats. During a recording operation, the output of encoder 31 is coupled by way of a selector switch 33 to recording head 35 via an equalizer amplifier 34. This equalizer amplifier is conventional, forms no part of the present invention per se and further description thereof is not provided.

In a playback operation, the digital video signals previously recorded on magnetic medium 36 are reproduced by head 35 and coupled to a decoder 37 which is compatible with encoder 31 and operates in accordance with conventional formats, such as the D-1 or D-2 format. It will be appreciated, therefore, that decoder 37 is of conventional construction. During a playback operation, the output of decoder 37 is coupled by way of a selector switch 38 to DAC 21 via a signal adjuster 42. The purpose of this signal adjuster is to provide the aforementioned compensation or pre-correction of the digital video signal reproduced from magnetic medium 36.

Signal adjuster 42 is adapted to provide one or more of the following adjustments to the digital video signal supplied thereto: a setup adjustment, a video gain adjustment, a chroma gain adjustment and a color hue adjustment. As will be described, a setup adjustment is adapted to adjust the black level included in the reproduced digital video signal to compensate for changes therein caused by analog processing. Video gain adjustment is adapted to adjust the video gray level in the reproduced digital video signal to compensate for changes therein caused by analog processing. Chroma gain adjustment is adapted to compensate for changes in the chrominance subcarrier, such as the usual burst signal, included in the digital video signal, as may be caused by analog processing. Each of these adjustments is described in greater detail below.

The multi-loop test arrangement is adapted to detect changes in a digital video signal that may be expected as a result of analog processing and thereby establish the aforementioned setup, video gain, chroma gain and color hue adjustments for signal adjuster 42. As illustrated, the multi-loop test arrangement includes a test signal generator 32 which is adapted to generate digital test signals having one or more characteristics whose changes caused by analog processing are to be detected. In the preferred embodiment, test signal generator 32 operates to generate three distinctive test signals, one to establish the proper setup adjustment, another to establish the proper video gain adjustment and a third to establish the proper chroma gain adjustment. If desired, the test signal generator also may generate an additional test signal for use in establishing the color hue adjustment. Test signal generator 32 is selectively coupled through equalizer amplifier 34 to decoder 37 and signal adjuster 42 by selector switch 33 when the illustrated apparatus operates in its test mode. It will be appreciated that, in this test mode, the digital test signal generated by test signal generator 32 emulates the recording and playing back of a digital video signal, as when the digital video system operates in its record/playback mode. As an alternative, an analog test signal generator may be coupled to analog input terminal 11 to supply analog test signals which are converted to digital form and used for the same purpose as the aforementioned digital test signals generated by test signal generator 32.

In the test mode, a digital test signal produced by, for example, test signal generator 32, is coupled to the signal processing components of the digital video recorder included in digital video system 30 (represented here merely by equalizer amplifier 34 and decoder 37) by way of selector switch 33. Then, selector switch 38 couples the digital test signal through signal adjuster 42 to DAC 21 and analog output terminal 12. The converted test signal is fed back from analog output terminal 12 to analog input terminal 11 by way of analog circuits 50, such as an analog switcher, a terminal 51 and a conventional BNC cable BNC cable is described in Harper, *Handbook of Components for Electronics*, 1977). This may be viewed as one pass, or circulation, of the digital test signal. Thereafter, further circulations of the digital test signal are effected by coupling the digitized version of the fed back signal, as produced by ADC 20, to signal adjuster 42 and DAC 21 by way of a memory 39 which is connected in this circulating loop by yet another selector switch 41. The purpose of memory 39 is to prevent the circulating loop from undergoing oscillations; and in a preferred embodiment, memory 39 comprises a field memory. It is seen, therefore, that subsequent circulations of the digital test signal follow the path from ADC 20 to memory 39 to signal adjuster 42 to DAC 21 and then back to ADC 20 by the BNC connector. It is further appreciated that, with each such circulation, or cycle of the digital test signal, the digital test signal is subjected to deterioration relative to the initial digital test signal because of the analog processing effected primarily by ADC 20, DAC 21 and analog circuits 50. It is this deterioration which is detected and used to control signal adjuster 42 so as to compensate or pre-correct the digital video signal subsequently reproduced from magnetic medium 36.

It is recognized that selector switch 38 controls a loop switching operation. At an initial time when digital video system 30 is disposed in its test mode, the digital test signal provided by test signal generator 32 is selected by switch 38, which engages its contact a, and thus is supplied as an input to the loop. Thereafter, at a delayed time equal at least to the delay exhibited by memory 39, switch 38 is changed over to its contact b to connect memory 39 into this loop. Hence, the digital test signal, subjected to the analog processing of ADC 20, DAC 21 and analog circuits 50, circulates through the loop.

A detector 43 is coupled to the loop for detecting changes in the digital test signal as that signal circulates through the loop. As shown in FIG. 1, detector 43 is coupled to the output of selector switch 38 and, in the preferred embodiment, is adapted to detect changes after the digital test signal has circulated a predetermined number of times (for example, 20 times). As will be described below, the detector includes temporary storage circuits, such as latch circuits, for storing the initial digital test signal generated by test signal generator 32 and also the digital test signal after the Mth circulation thereof. Differences in these digital test signals are detected, and a change indication signal representative thereof is produced. As will be described, the operation carried out by detector 43 is determined by whether signal adjuster 42 operates for setup adjustment, video gain adjustment, chroma gain adjustment or color hue adjustment.

An adjustment control data generator 44 is coupled to detector 43 and is responsive to the change indication signal produced by the detector for supplying adjustment control data to signal adjuster 42. In the embodiment described below in connection with FIGS. 5A and 5B, one embodiment of adjustment control data generator 44 comprises an addressable memory, such as a read only memory (ROM) for storing different adjustment control data values which are addressed by the change indication signal supplied thereto by detector 43. Thus, the adjustment control data generator may be implemented by a look-up table that is accessed by the detected change in the circulated digital test signal. It will be appreciated that this look-up table is adapted to store setup adjustment, video gain adjustment, chroma gain adjustment and color hue adjustment data.

It is desirable to provide an indication of the number of times the digital test signal circulates through the illustrated loop. Since digital video system 30 is comprised of digital processing circuits, the circulation of the digital test signal is synchronized with the timed operation of such circuits. One of ordinary skill in the art will appreciate that this timing, as well as distinctive portions of the digital test signal, may be used to count the number of times the digital test signal circulates. Consequently, it is relatively straightforward to count such circulations and to provide an indication thereof. In one embodiment, a bar graph generator 40, which may be of a type known to those of ordinary skill in the art, is responsive to such indications to generate bar graph signals representing the number of times that the digital test signal circulates through the loop. This bar graph indicia is incremented in response to each circulation; and when the digital test signal has circulated M times, the bar graph generator is reset.

A selector switch 41, which normally is coupled to memory 39 by way of its contact a, is selectively changed over to its contact b so as to couple the bar graph signals generated by bar graph generator 40 to the loop. Although not shown, it will be understood that selector switch 41 is changed over from its contact a to contact b at predetermined times during each cycle of the digital test signal through the loop, thereby multiplexing, or superimposing, the bar graph signals onto the digital test signal.

A display 60, such as a monitor, is coupled to analog output terminal 12 to receive the signals provided thereat. During a playback mode, digital video signals reproduced from magnetic medium 36 are converted to analog form by DAC 21 and coupled from analog output terminal 12 to display 60 whereat the video signals are displayed as a video picture. During a test mode, the digital test signal which circulates through the loop is converted to analog form by the DAC and coupled from analog output terminal 12 to display 60 whereat the test signal is displayed. For example, the test signal may include a conventional color bar signal which (as shown in FIG. 1) is displayed as color bar display 61. Alternatively, other digital test signals may be displayed after they are converted to analog form. Display 60 also displays bar graph indication 62 which is derived from the bar graph signals generated by bar graph generator 40 as the digital test signal circulates through the loop. It will be appreciated that adjustments in the displayed test signal may be observed on the monitor as signal adjuster 42 effects a setup adjustment, a video gain adjustment, a chroma gain adjustment or a color hue adjustment. It will also be recognized that as bar graph display 62 changes in response to each circulation of the digital test signal, such changes likewise may be observed.

The manner in which predetermined characteristics of the digital test signal generated by test signal generator 32 are adjusted now will be described. Let it be assumed that signal adjuster 42 effects a setup adjustment. Accordingly, test signal generator 32 generates digital samples of a video black level. Let it be assumed that the initial video black level test signal generated by the test signal generator is represented as the solid line $BL_0$ in FIG. 2; and this initial black level test signal is supplied to detector 43 by selector switch 38 which engages its contact a. This black level test signal also is supplied by switch 38 to the illustrated loop; and after the initial circulation thereof, the black level test signal is coupled to memory 39 and selector switch 38 changes over to engage its contact b. The black level test signal then circulates through the loop a total of M times, with each circulation serving to increment the bar graph indication generated by bar graph generator 40.

Figure 2:
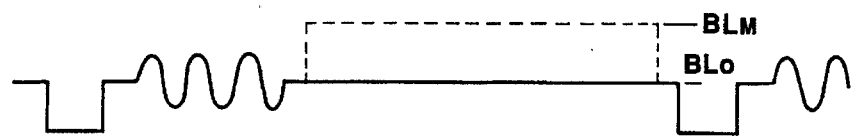
FIGS. 2–4 are waveform diagrams which are useful in understanding how the video signal adjustments are made by the apparatus shown in FIG. 1.

Let it be assumed that the black level test signal provided at the Mth circulation is represented as the broken line $BL_M$ in FIG. 2. Detector 43 operates to detect the change $\Delta S$ in the black level test signal during one circulation of the black level test signal through the loop in accordance with the following equation:

$$\Delta S = \frac{BL_M - BL_0}{M} \qquad 1$$

This change indication $\Delta S$ is supplied as an address to adjustment control data generator 44 from which a video black level adjustment value is read and supplied to signal adjuster 42 to compensate or correct for the detected change. In the present example wherein adjustment control data generator 44 is assumed to be an addressable storage device, each addressable location is adapted to store a respective adjustment value corresponding to the calculated change indication $\Delta S$. Thus, depending upon the initial black level test signal $BL_0$ and the black level test signal $BL_M$ following the Mth circulation, a corresponding adjustment value is supplied to signal adjuster 42. It will be appreciated that this adjustment value is used by the signal level adjuster not only to adjust the digital test signal supplied thereto during the test mode but also the digital video signal supplied thereto during a playback mode.

Figure 3:
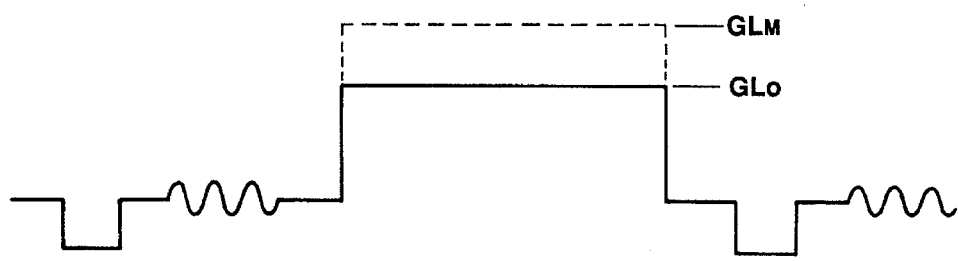

To implement video gain adjustment, test signal generator 32 generates a video gray level test signal, such as video gray level samples. It will be appreciated that the test signal generator may operate first to generate the aforementioned black level test signal for a predetermined amount of time, followed by the gray level test signal. Alternatively, a suitable manual control, such as a selector switch, may be operated by a user to change over the type of test signal generated by test signal generator 32. In any event, the gray level test signal initially produced by the test signal generator is supplied by selector switches 33 and 38 to the illustrated loop, and this initial gray level test signal $GL_0$, as represented by the solid line in FIG. 3, is coupled to detector 43. This gray level test signal is circulated through the loop M times, and it is expected that, as a result of the analog processing effected by ADC 20, DAC 21 and analog circuits 50, the level of the gray level test signal $GL_M$ at the Mth circulation will be different from the initial gray level $GL_0$ as shown by the broken line in FIG. 3. Detector 43 operates to detect the change $\Delta V$ in the gray level test signal during one circulation thereof in accordance with the following equation:

$$\Delta V = \sqrt{GL_M - GL_0} \qquad 2$$

This change indication $\Delta V$ is supplied as an address to adjustment control data generator 44 from which a video gray level adjustment value is read and supplied to signal adjuster 42. Accordingly, the signal adjuster is controlled to minimize the difference in the gray level shown in FIG. 3 both for the gray level test signal supplied thereto during the test mode and for the digital video signal supplied thereto during a playback mode.

Figure 4:
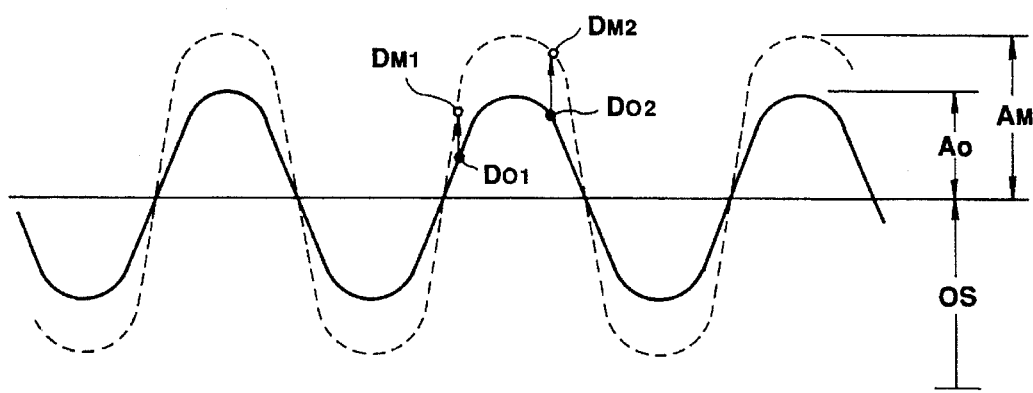

When carrying out a chroma gain adjustment operation, test signal generator 32 generates digital samples of a single frequency test signal having a predetermined DC offset, such as shown by the solid waveform of FIG. 4. The amplitude of this single frequency test signal may be represented as $A_0$ and its DC offset is represented as OS. After circulating through the loop M times, it is expected that the amplitude of the single frequency test signal will change to that represented by the broken lines and identified as $A_M$, having the same DC offset value OS. Detector 43 and adjustment control data generator 44 cooperate to supply adjustment control data to signal adjuster 42 in response to a change $\Delta C$ in the amplitude of the single frequency test signal resulting from one circulation thereof. This detected change $\Delta C$ may be represented as $$\Delta C = \sqrt[M]{\frac{A_M}{A_0}}.$$

Since the single frequency test signal produced by test signal generator 32 is comprised of samples, this ratio $A_M/A_0$ is obtained by root sum square (RSS) processing of predetermined samples.

As shown in FIG. 4, if initial single frequency test signal samples are represented as samples $D_{01}$ and $D_{02}$, then these samples, after circulating through the loop M times, will appear as samples $D_{M1}$ and $D_{M2}$, respectively. Detector 43 operates to detect each of these samples $D_{01}$, $D_{02}$, $D_{M1}$ and $D_{M2}$ and to supply these detected samples to a root sum square processor. The root sum square processor determines the amplitude variation $\Delta C$ for one circulation of the single frequency test signal in accordance with the following:

$$\Delta C = \sqrt[M]{\frac{\sqrt{(D_{M1} - OS)^2 + (D_{M2} - OS)^2}}{\sqrt{(D_{01} - OS)^2 + (D_{02} - OS)^2}}}$$

$$= \sqrt[M]{\frac{\sqrt{2A_M^2}}{\sqrt{2A_0^2}}}$$

$$\Delta C = \sqrt[M]{\frac{A_M}{A_0}}$$

This detected variation $\Delta C$ is used to address the look-up table which comprises adjustment control data generator 44 to read therefrom a suitable adjustment control value corresponding to this detected variation $\Delta C$. Thus, signal adjuster 42 is controlled, or set, to adjust the single frequency test signal supplied thereto during a test mode and also to adjust the video signals supplied thereto during a playback mode to effect chroma gain adjustment. This minimizes the change in the chroma gain of the reproduced digital video signal as would otherwise be caused by analog processing thereof, such as dubbing.

From the foregoing, it is seen that detector 43 operates to detect changes in the digital test signal after that signal has circulated through the loop M times, from which the change in the digital test signal caused by one circulation is determined. Then, signal adjuster 42 is controlled, or set by adjustment control data produced by adjustment control data generator 44 in response to the determined change so as to eliminate or at least minimize such change. This operation is applicable to a setup adjustment, a video gain adjustment or a chroma gain adjustment. In addition, although not described herein, a color hue adjustment may be made in a similar manner. Once signal adjuster 42 has been set to eliminate or minimize changes in the aforementioned characteristics of the digital test signal, these same settings operate on the digital video signal reproduced from magnetic medium 36 so as to avoid degradation that may be caused by dubbing and other analog processing of an analog video signal derived therefrom.

In the embodiment described herein, M may be any desired predetermined value; and in one embodiment, M=20.

Figure 5A:
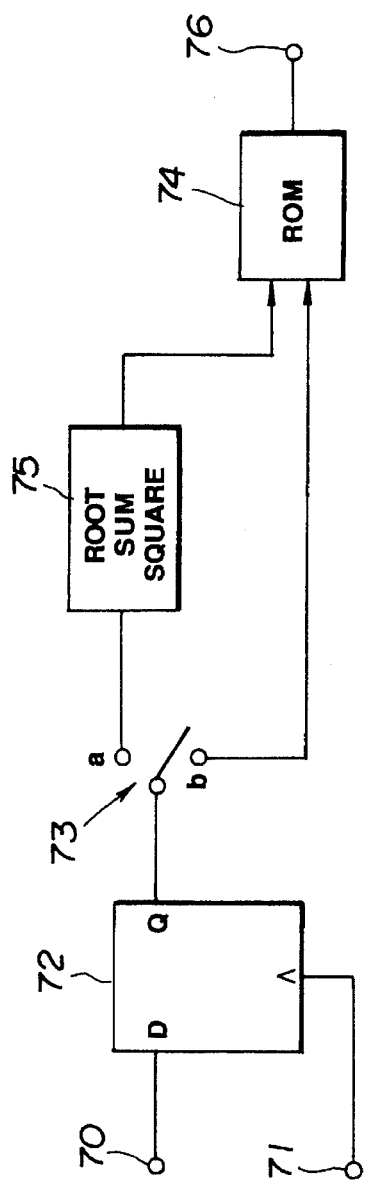
FIGS. 5A and 5B are block diagrams of the implementation of a portion of the apparatus shown in FIG. 1.
Figure 5B:
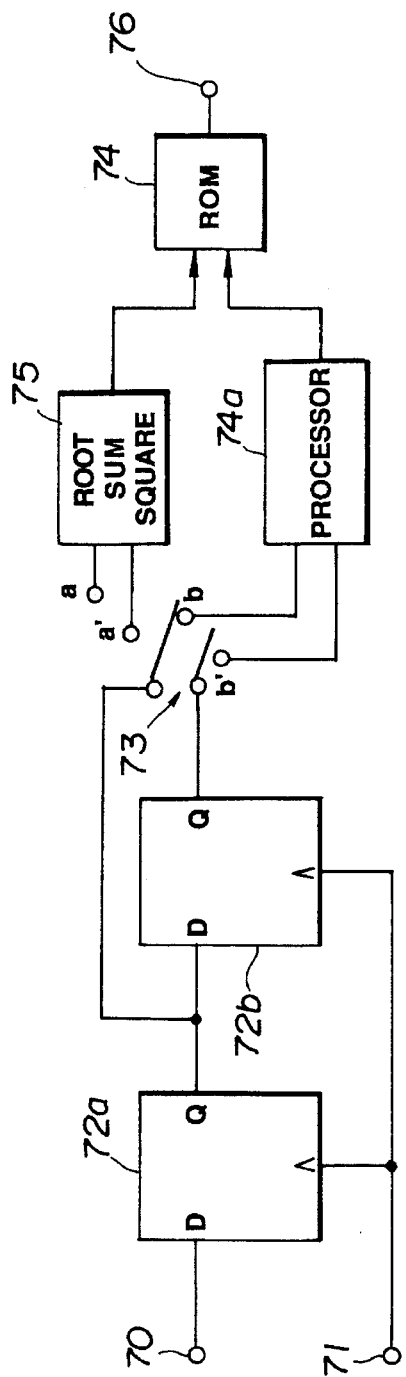

One embodiment of detector 43 and adjustment control data generator 44 is illustrated broadly in FIG. 5A and a particular implementation of this embodiment is shown in FIG. 5B. As illustrated, a latch circuit 72, schematically represented as a D-type latch circuit, includes a data input coupled to an input terminal 70 for receiving the digital test signal supplied thereto by selector switch 38 shown in FIG. 1. Latch circuit 72 includes a latch input coupled to a timing input terminal 71 which is adapted to receive a latch pulse when the digital test signal generated by test signal generator 32 initially is supplied to the loop by switch 38 and to receive another latch pulse after the digital test signal has circulated through the loop M times. One of ordinary skill in the art will recognize how these timing signals may be generated, as discussed above.

In FIG. 5B, latch circuit 72 is illustrated as cascaded latch circuits 72a and 72b, wherein latch circuit 72b is adapted to store temporarily the digital test signal initially supplied to the loop by test signal generator 32 and latch circuit 72a is adapted to store the digital test signal that has been circulated M times. It will be appreciated that the initial digital test signal first is stored in latch circuit 72a in response to the initial latch pulse and then is shifted into latch 72b in response to the latch pulse produced after the Mth circulation of the digital test signal.

Returning to FIG. 5A, the detected change in the test signal $\Delta S$ or $\Delta V$, representing the change in the digital test signal following one circulation thereof through the loop, is coupled by way of a selector switch 73 to a ROM 74. This detected change $\Delta S$ or $\Delta V$ is used as an address for reading out from the ROM the particular adjustment control data stored at the addressed location. This adjustment control data is coupled to an output terminal 76 from which it is supplied to signal adjuster 42.

FIG. 5B illustrates, in somewhat greater detail, the manner in which the change in the digital test signal after that signal has circulated through the loop M times is detected. A processor 74a operates to implement equation (1) or equation (2), as may be selected. For example, to carry out a setup adjustment, it is appreciated that latch circuit 72b supplies processor 74a with the initial video black level signal $BL_0$ provided by test signal generator 32 to the loop. Latch circuit 72a couples to processor 74a the video black level signal $BL_M$ that has circulated through the loop M times. The processor then determines the change $\Delta S$ in the video black level test signal for one circulation thereof and supplies this change $\Delta S$ as an address to ROM 74 from which corresponding adjustment control data is read and supplied to signal adjuster 42.

Similarly, when video gain adjustment is carried out, latch circuit 72b stores the initial video gray level test signal $GL_0$ applied to the loop by test signal generator 32; and latch circuit 72a stores the video gray level test signal $GL_M$ that has circulated through the loop M times. These latched video gray level test signals are supplied to processor 74a which processes the difference between these video gray level test signals in accordance with equation (2) to supply an address ΔV to ROM 74, wherein ΔV corresponds to the change in the video gray level test signal produced during one circulation through the loop of the digital test signal.

When chroma gain adjustment is carried out, latch circuit 72b stores samples $D_{01}$ and $D_{02}$ of the initial single frequency test signal applied to the loop by test signal generator 32 and latch circuit 72a stores the samples $D_{M1}$ and $D_{M2}$ from the single frequency signal that has circulated through the loop M times. Now, change-over switch 73 supplies these respective samples to root sum square circuit 75 which implements equation (3) to produce the address ΔC representing the change in the amplitude of the single frequency test signal. This address ΔC addresses ROM 74 to read therefrom the corresponding adjustment control data which, in turn, is used to set signal adjuster 42.

In the foregoing description of the adjustment apparatus illustrated in FIG. 1, it has been assumed that the digital test signal is generated either by test signal generator 32 or by an external source that is coupled to analog input terminal 11. If an external source is used, that source may be of a conventional type, such as a conventional color bar generator. Alternatively, a test signal, or successive test signals (such as the aforementioned video black level signal, video gray level signal and single frequency signal) may be recorded on magnetic medium 36 and reproduced therefrom by head 35 for coupling to the test loop. In addition, although signal adjuster 42 preferably effects automatic adjustment in response to adjustment control data supplied thereto by generator 44, as has been described above, the signal adjuster may be manually operated. To assist such manual operation, suitable indications of differences in the test signal after that signal has circulated through the loop M times may be provided. Alternatively, the display of the test signal, such as by monitor 60, may be observed by the operator in effecting such manual adjustments.

Although a bar graph display 62 generated by bar graph generator 40 has been described above, it will be appreciated that, if desired, other suitable displays of the number of circulations of the digital test signal through the test loop may be provided. For example, a numerical display indicative of the particular cycle of the digital test signal may be displayed.

Digital video system 30 also may be operated so as to record each digital test signal that cycles through the test loop. For example, in addition to being coupled from ADC 20 to memory 39 and then to signal adjuster 42 and DAC 21, the circulating digital test signal may be coupled by selector switch 33 to equalizer amplifier 34 and recording head 35. In this manner, a record of the circulating digital test signal, including changes therein produced during each circulation, may be made. This record may be checked simply by playing back magnetic medium 36. In addition to recording each circulation of the digital test signal, the superimposed bar graph signals, or other circulation indicating signals, also may be recorded. Upon playback, a user thus may observe the degree of change in the digital test signal that is present during each respective cycle thereof through the test loop.

While the present invention has been particularly shown and described with reference to a preferred embodiment, it will be readily appreciated by those of ordinary skill in the art that various changes and modifications may be made without departing from the spirit and scope of the invention. For example, the implementation of detector 43 and adjustment control generator 44, as shown by the block diagrams of FIGS. 5A and 5B may be further modified in a manner to implement equations (1), (2) and (3) directly (i.e. without using a ROM or look-up table). Also, test signal generator 32 may generate other types of digital test signals which are useful in compensating or pre-correcting digital video signals from deterioration and degradation caused by conversion of those digital video signals to analog form and subsequent analog signal processing.

In a preferred embodiment, it has been assumed that M=20; although any other desired number of circulations of the digital test signal may be made for the purpose of detecting changes therein.

It is intended that the appended claims be interpreted to cover the specific embodiment described herein, those changes and modifications suggested above and all equivalents thereto.

What is claimed is:

1. Apparatus for adjusting a digital signal reproduced from a record medium, the reproduced digital signal thereafter being subjected to analog processing, comprising:

test input means for providing an input digital test signal;

loop means including digital-to-analog converting means and analog-to-digital converting means for circulating the digital test signal through said loop means a predetermined number of times;

detecting means for detecting changes in said digital test signal after said digital test signal has been recirculated through said loop means said predetermined number of times to produce change indications corresponding to respective detected changes; and automatic adjustment means including storage means having addresses at which there are stored adjustment values and which are accessed by said change indications, respectively, for reading the corresponding adjustment values from said storage means, and means selectively supplied with said digital signal reproduced from the record medium and being responsive to said adjustment values read from said storage means for adjusting predetermined characteristics of the reproduced digital signal.

2. The apparatus of claim 1 further comprising means for selectively including said automatic adjustment means in said loop means so that said automatic adjustment means is then selectively supplied with said digital test signal circulating through said loop means to adjust said predetermined characteristics therein.

3. The apparatus of claim 1 wherein said test input means comprises a test signal generator for generating a digital test signal having at least one of said predetermined characteristics.

4. The apparatus of claim 3 wherein the digital test signal represents a video black level signal; and wherein said automatic adjustment means comprises setup adjustment means for adjusting a black level in the digital signal reproduced from said record medium as a function of detected changes in the digital test signal after said digital test signal has circulated through said loop means said predetermined number of times.

5. The apparatus of claim 3 wherein the digital test signal represents a video gray level signal; and wherein said automatic adjustment means comprises video gain adjustment means for adjusting a gray level in the digital signal reproduced from said record medium as a function of detected changes in the digital test signal after said digital test signal has circulated through said loop means said predetermined number of times.

6. The apparatus of claim 3 wherein said digital test signal comprises a video black level signal; and wherein said detecting means comprises black level detecting means for detecting a change in said video black level signal after said video black level signal is circulated through said loop means said predetermined number of times.

7. The apparatus of claim 6 wherein said black level detecting means produces a change indication ΔS, where $$\Delta S = \frac{BL_M - BL_O}{M},$$

$BL_O$ represents the video black level signal first provided by said test signal generator, $BL_M$ represents the video black level signal that has circulated through said loop means said predetermined number of times, and M is said predetermined number; and wherein said adjustment means includes level adjustment means for adjusting a video black level by an amount determined by ΔS.

8. The apparatus of claim 6 wherein said black level detecting means comprises latch means for latching the video black level signal provided by said test signal generator at an initial time and for latching the video black level signal that has circulated through said loop means said predetermined number of times; and comparison means for comparing the latched video black level signals to each other.

9. The apparatus of claim 8 wherein said adjustment means includes addressable storage means having addressable locations for storing video black level adjustment values; and wherein said comparison means generates an address ΔS for said storage means, wherein $$\Delta S = \frac{BL_M - BL_O}{M},$$

$BL_M$ represents the latched video black level signal that has circulated through said loop means said predetermined number of times, $BL_O$ represents the video black level signal provided by said test signal generator at said initial time, and M is said predetermined number.

10. The apparatus of claim 9 wherein said adjustment means further includes level adjustment means for adjusting a video black level included in a digital signal reproduced from said record medium by an amount determined by ΔS.

11. The apparatus of claim 3 wherein said digital test signal comprises a video gray level signal; and wherein said detecting means comprises gray level detecting means for detecting a change in said video gray level signal after said video gray level signal is circulated through said loop means said predetermined number of times.

12. The apparatus of claim 11 wherein said gray level detecting means comprises latch means for latching the video gray level signal provided by said test signal generator at an initial time and for latching the video gray level signal that has circulated through said loop means said predetermined number of times; and comparison means for comparing the latched video gray level signals to each other.

13. The apparatus of claim 3 wherein said digital test signal comprises samples of a single frequency signal having a predetermined DC offset; and wherein said detecting means comprises sample change means for detecting a change in said samples after said samples are circulated through said loop means said predetermined number of times.

14. The apparatus of claim 1 wherein said loop means includes selector switch means for selectively coupling said test input means to said loop means for an initial circulation of said digital test signal through said loop means.

15. The apparatus of claim 14 wherein said test input means comprises signal playback means for playing back a digital test signal recorded on said record medium.

16. The apparatus of claim 14 wherein said loop means includes memory means for temporarily storing the digital test signal to prevent said loop means from oscillating.

17. The apparatus of claim 16 wherein said selector switch means is selectively coupled to said test input means or to said memory means for circulating the digital test signal provided by said test input means or the temporarily stored digital test signal.

18. The apparatus of claim 1 further comprising display means coupled to the digital-to-analog converting means of said loop means for displaying a video image derived from a digital signal reproduced from said record medium; and circulation indicating means coupled to said loop means for sensing the number of times the digital test signal has circulated through said loop means and for supplying said display means with an indication thereof for display.

19. The apparatus of claim 18 wherein said circulation indicating means includes bar graph generating means for generating bar graph display signals representing the number of times said digital test signal has circulated through said loop means, and means for coupling said bar graph display signals to said display means.

20. The apparatus of claim 19 wherein said loop means includes memory means for temporarily storing the digital test signal to prevent said loop means from oscillating; and further including switch means for selectively coupling said memory means or said bar graph generating means to said digital-to-analog converting means.

21. The apparatus of claim 3 wherein the digital test signal represents a single frequency signal; and wherein said automatic adjustment means comprises chroma gain adjustment means for adjusting chroma gain of the digital signal reproduced from said record medium as a function of detected changes in the digital test signal after said digital test signal has circulated through said loop means said predetermined number of times.

22. The apparatus of claim 1 further including
circulation indicating means coupled to said loop means for sensing the number of times the digital test signal circulates through said loop means to produce an indicating signal indicative thereof;

display means coupled to said loop means for selectively receiving and displaying a video signal that has been adjusted by said adjustment means after being reproduced from said record medium, the digital test signal and the indicating signal; and mode select means for selecting a playback mode to supply to said adjustment means a digital video signal reproduced from said record medium, and for selecting said test mode to connect said loop means to said adjustment means and to couple said test input means and said circulation indicating means to said loop means whereby said digital test signal is circulated and an indication of the number of times of such circulation is displayed.

23. The apparatus of claim 22 wherein said mode select means includes selector switch means for coupling said source to said loop means and for selectively coupling said circulation indicating means to said loop means during only a portion of a circulation period.

24. The apparatus of claim 23 wherein said selector switch means further operates in a playback mode to interrupt said loop means and to couple the video signal reproduced from said record medium to said adjusting means.

25. The apparatus of claim 23 wherein said source comprises a video signal generator for generating a digital video test signal; and wherein said display means displays the video test signal and said indicating signal superimposed thereon.

26. The apparatus of claim 25 wherein said video signal generator comprises a color bar generator.

27. The apparatus of claim 22 wherein said circulation indicating means includes bar graph generating means for generating bar graph signals for display by said display means to indicate the number of times the digital test signal circulates through said loop means.

28. Apparatus for adjusting a digital signal reproduced from a record medium, the reproduced digital signal thereafter being subjected to analog processing, comprising:

test input means including a test signal generator for generating a digital video gray level signal;

loop means including digital-to-analog converting means and analog-to-digital converting means for circulating the digital video gray level signal through said loop means a predetermined number of times;

detecting means including gray level detecting means for detecting a change in said video gray level signal after said video gray level signal is circulated through said loop means said predetermined number of times to produce a change indication $\Delta V$, where $$\Delta V = \sqrt[M]{GL_M - GL_O} \quad ,$$

$Gl_O$ represents the video gray level signal first provided by said test signal generator, $GL_M$ represents the video gray level signal that has circulated through said loop means said predetermined number of times, and M is said predetermined number; and automatic adjustment means selectively supplied with said digital signal reproduced from said record medium and including level adjustment means for adjusting a video gray level of said reproduced digital signal by an amount determined by said change indication $\Delta V$.

29. Apparatus for adjusting a digital signal reproduced from a record medium, the reproduced digital signal thereafter being subjected to analog processing, comprising test input means including a test signal generator for generating a digital video gray level signal;

loop means including digital-to-analog converting means and analog-to-digital converting means for circulating the digital video gray level signal through said loop means a predetermined number of times;

gray level detecting means including latch means for latching the video gray level signal provided by said test signal generator at an initial time and for latching the video gray level signal that has circulated through said loop means said predetermined number of times, and comparison means for comparing the latched video gray level signals to each other to produce a change indication; and automatic adjustment means responsive to said change indication and selectively supplied with said digital signal reproduced from said record medium to adjust predetermined adjusting means including addressable storage means having addressable locations for storing video gray level adjustment values, said change indication produced by said comparison means constituting an address $\Delta V$ for said storage means, wherein $$\Delta V = \sqrt[M]{GL_M - GL_O} \quad ,$$

$GL_M$ represents the latched video gray level signal that has circulated through said loop means said predetermined number of times, $GL_O$ represents the video gray level signal provided by said test signal generator at said initial time, and M is said predetermined number.

30. The apparatus of claim 29 wherein said adjustment means further includes gray level adjusting means for adjusting a video gray level included in the digital signal reproduced from said record medium by an amount determined by $\Delta V$.

31. Apparatus for adjusting a digital signal reproduced from a record medium, the reproduced digital signal thereafter being subjected to analog processing, comprising test input means including a test signal generator for generating a digital test signal comprised of samples of a single frequency signal having a predetermined DC offset;

loop means including digital-to-analog converting means and analog-to-digital converting means for circulating the samples of a single frequency signal through said loop means a predetermined number of times;

detecting means including sample change means for detecting a change in said samples after said samples are circulated through said loop means said predetermined number of times to produce a change indication $\Delta C$, where $$\Delta C = \sqrt[M]{\frac{\sqrt{(D_{M1} - OS)^2 + (D_{M2} - OS)^2}}{\sqrt{(D_{O1} - OS)^2 + (D_{O2} - OS)^2}}} \quad ,$$

OS represents said DC offset, $D_{O1}$ and $D_{O2}$ represent the samples of the single frequency signal first provided by said test signal generator, $D_{M1}$ and $D_{M2}$ represent the samples that have circulated through said loop means said predetermined number of times, and M is said predetermined number; and automatic adjustment means selectively supplied with said digital signal reproduced from said record medium and including level adjustment means for adjusting said single frequency signal level thereof by an amount determined by said change indication $\Delta C$.

32. Apparatus for adjusting a digital signal reproduced from a record medium, the reproduced digital signal thereafter being subjected to analog processing, comprising test input means including a test signal generator for generating a digital test signal comprised of samples of a single frequency signal having a predetermined DC offset;

loop means including digital-to-analog converting means and analog-to-digital converting means for circulating the samples of a single frequency signal through said loop means a predetermined number of times;

detecting means including sample change means for detecting a change in said samples after said samples are circulated through said loop means said predetermined number of times, said sample change means comprising latch means for latching predetermined samples of the single frequency signal provided by said test signal generator at an initial time and for latching substantially the same predetermined samples that have circulated through said loop means said predetermined number of times, and square sum processing means for sensing a change $\Delta C$ in said latched sample, where $$\Delta C = {}^M\!\!\sqrt{\frac{\sqrt{(D_{M1}-OS)^2+(D_{M2}-OS)^2}}{\sqrt{(D_{O1}-OS)^2+(D_{O2}-OS)^2}}},$$

OS represents said DC offset, $D_{O1}$ and $D_{O2}$ represent the predetermined samples of the single frequency signal provided by said test signal generator at said initial time, $D_{M1}$ and $D_{M2}$ represent the samples that have circulated through said loop means said predetermined number of times, and M is said predetermined number; and automatic adjustment means responsive to said change $\Delta C$ and selectively supplied with said digital signal reproduced from said record medium to adjust a level of the reproduced digital signal.

33. The apparatus of claim 32 wherein said adjustment means includes addressable storage means for storing level adjustment values; means for supplying the sensed change $\Delta C$ as an address to said addressable storage means for reading a corresponding level adjustment value therefrom; and level adjusting means for adjusting a digital signal reproduced from said record medium by the level adjustment value read from said addressable storage means.

* * * * *